US012626552B2

(12) United States Patent
Lederer et al.

(10) Patent No.: US 12,626,552 B2
(45) Date of Patent: May 12, 2026

(54) SYSTEM AND METHOD FOR REMOTELY OPERATING A SWITCH

(71) Applicant: Nimbio Labs, Inc., Las Vegas, NV (US)

(72) Inventors: Howard Lederer, Las Vegas, NV (US); Ephraim Lindquist, Las Vegas, NV (US)

(73) Assignee: Nimbio Labs, Inc., Las Vegas, NV (US)

( * ) Notice: Subject to any disclaimer, the term of this patent is extended or adjusted under 35 U.S.C. 154(b) by 20 days.

(21) Appl. No.: 19/018,907

(22) Filed: Jan. 13, 2025

(65) Prior Publication Data

US 2025/0232625 A1 Jul. 17, 2025

Related U.S. Application Data

(60) Provisional application No. 63/620,592, filed on Jan. 12, 2024.

(51) Int. Cl.
*G07C 9/00* (2020.01)
*G07C 9/21* (2020.01)

(52) U.S. Cl.
CPC ..... *G07C 9/00309* (2013.01); *G07C 9/00904* (2013.01); *G07C 9/21* (2020.01)

(58) Field of Classification Search
CPC ... G07C 9/00309; G07C 9/00904; G07C 9/21
See application file for complete search history.

(56) References Cited

U.S. PATENT DOCUMENTS

| | | | |
|---|---|---|---|
| 6,226,750 | B1 | 5/2001 | Trieger |
| 9,141,150 | B1 | 9/2015 | Trundle et al. |
| 9,424,699 | B2 | 8/2016 | Kusens et al. |
| 9,450,958 | B1 | 9/2016 | Saylor et al. |
| 10,043,331 | B1 | 8/2018 | Johnson et al. |

(Continued)

FOREIGN PATENT DOCUMENTS

CN 116783633 A 9/2023

OTHER PUBLICATIONS

Extended European Search Report from related European Patent Application No. 18741542.7 dated Sep. 28, 2020.

(Continued)

*Primary Examiner* — Omeed Alizada
(74) *Attorney, Agent, or Firm* — Dergosits & Noah LLP

(57) ABSTRACT

Methods and systems for operating a switching device are described herein. A switching control component on a server may receive a URL request that includes a unique ID from an NFC token proximate to the switching device. The switching control component determines if the URL request includes valid login data, and when valid login data is detected for a user with permission to access the door associated with the NFC token, a message to the switching device with instructions to open the door may be transmitted. When the URL request includes valid login data for a user without permission to unlock the door, a selectable list of users who have previously granted the user access to the door may be transmitted. Finally, when the URL request does not include valid login data, a URL may be sent providing a tap-to-unlock application download message and at least one alternative access option.

20 Claims, 5 Drawing Sheets

(56) References Cited

U.S. PATENT DOCUMENTS

| | | | |
|---|---|---|---|
| 10,070,035 B2 | 9/2018 | Slavin et al. | |
| 10,127,798 B1 | 11/2018 | Trundle et al. | |
| 10,147,306 B2 | 12/2018 | Kinney et al. | |
| 10,282,927 B1 | 5/2019 | Hutz et al. | |
| 10,755,501 B2 | 8/2020 | Kaye et al. | |
| 11,282,310 B1 | 3/2022 | Charling et al. | |
| 2004/0019787 A1 | 1/2004 | Shibata | |
| 2015/0067792 A1 | 3/2015 | Benoit et al. | |
| 2016/0275739 A1 | 9/2016 | Scalisi | |
| 2016/0307380 A1 | 10/2016 | Ho et al. | |
| 2017/0104735 A1* | 4/2017 | Brown | H04L 63/061 |
| 2020/0162905 A1 | 5/2020 | Pernyer et al. | |
| 2022/0109986 A1 | 4/2022 | Jogand-Coulomb | |
| 2022/0131608 A1* | 4/2022 | Cromarty | H04R 9/048 |
| 2022/0230498 A1 | 7/2022 | Prevost et al. | |
| 2024/0054836 A1 | 2/2024 | Mukha | |

OTHER PUBLICATIONS

Office Communication from related European Patent Application No. 18741542.7 dated Oct. 6, 2022.

Office Action from related U.S. Appl. No. 15/877,818 dated Jan. 6, 2020.

International Search Report and Written Opinion from International Patent Application No. PCT/US18/14886 dated Apr. 17, 2018.

Ring Access Control Demo Recap, Gmail correspondence, Nov. 18, 2024.

Virtual Key Overview, Nov. 18, 2024.

International Search Report and Written Opinion from corresponding International Patent Application No. PCT/US2025/011416 dated Apr. 21, 2025.

* cited by examiner

SYSTEM AND METHOD FOR REMOTELY OPERATING A SWITCH

CROSS-REFERENCE TO RELATED APPLICATIONS

This application claims the benefit of U.S. Provisional Application No. 63/620,592, filed Jan. 12, 2024, which is incorporated herein in its entirety.

TECHNICAL FIELD

The claimed subject matter relates to the field of network communications, and more particularly to systems and methods that enable the remote operation of a switch.

BACKGROUND

Access control systems may use tokens (RFID, HID, NFC, etc) that are given to users in order to access doors and gates. Each user may have a unique token with which access can be granted or withdrawn using a centralized system (normally onsite). In most cases tokens cannot be used on two different systems. For example, if a user's apartment building and office building both have token-based systems, the user would have two different tokens.

SUMMARY

Embodiments according to the present disclosure provide a solution to operating a switching device using a tap-to-unlock application. A switching control component on a server may receive, via a communications link with a mobile communications device, a uniform resource locator (URL) request that includes a unique ID from a near field communication (NFC) token, the NFC token being located proximate to the switching device. The switching control component determines if the URL request includes valid login data associated with a user and may take one of a plurality of actions in response to the determination.

When both the URL request includes valid login data and the user is associated with an account that has permission to unlock the door by the switching control component, the switching control component may automatically respond to the URL request with a message, via a different communications link to the switching device, that includes instructions to open a door controlled by the switching device. When both the URL request includes valid login data and the user is not associated with an account that has permission to unlock the door by the switching control component, the control component may automatically respond to the URL request by transmitting a message, via the communications link and a tap-to-unlock application running on the mobile communications device, with a user interface providing a selectable list of users who have previously granted the user access to the door controlled by the switching device. The switching control component may cause a selected user on the list of users to be contacted via the tap-to-unlock application in response to being selected on the user interface, using a voice call or a video call, for example. Finally, when the URL request does not include valid login data associated with the user, the switching control component may automatically respond to the URL request, via the communications link, with a URL providing both at least one of a tap-to-unlock application download message and at least one alternative access option.

DETAILED DESCRIPTION

In an embodiment, the problems associated with existing systems are addressed and alleviated using a code, such as a near-field communication (NFC) token, placed near a door or gate that is to be controlled. Some embodiments may optionally employ past or future technology that a smart phone may read, including RFID and HID. For convenience, in this description, all such devices will be referred to as NFC tokens. Generally, as used in this description, an "NFC token" may be understood as a device (electronic (NFC, RFID, HID)) that may be used to gain access to an electronically restricted resource. The NFC token may be used to control a switch, e.g., a lock (electric strike, maglock, cloud controlled deadbolt, etc.) associated with the gate or door. This creates a tap-to-unlock relationship between the NFC token and the access point the associated user has permission to interact with and open.

Figure 1:
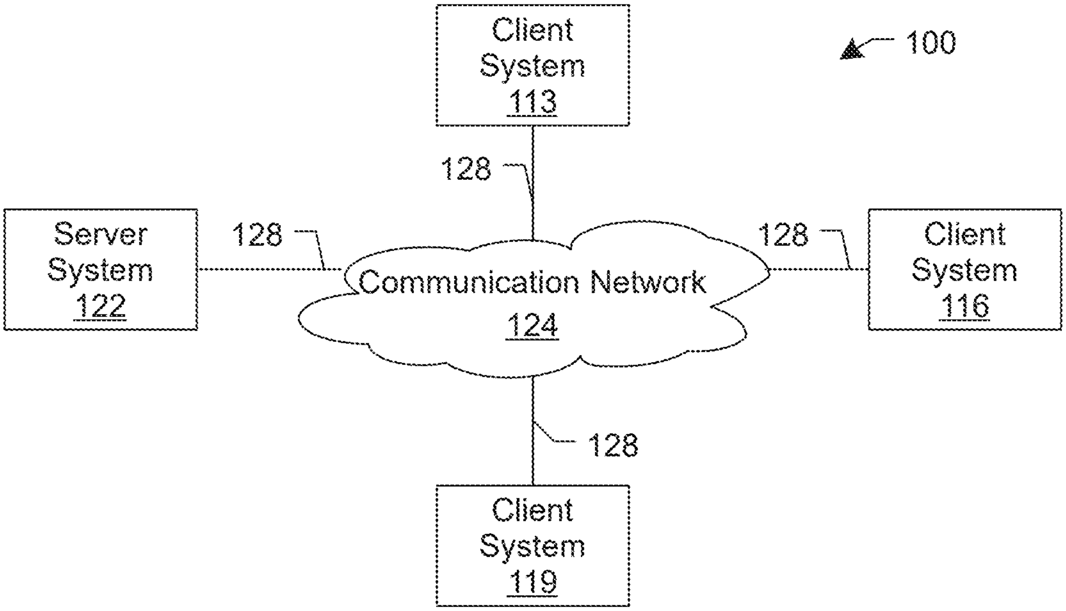
FIG. 1 shows a simplified block diagram of an embodiment of a distributed computer system supporting a tap-to-unlock transmitter device for access points.

FIG. 1 shows a simplified block diagram of an embodiment of a distributed computer system 100 for supporting a tap-to-unlock transmitter device for access points. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, Internet telephony, IP telephony, digital voice, voice over broadband (VoBB), broadband telephony, Voice over IP (VOIP), public switched telephone network (PSTN), and combinations of these, and the like.

System 100 in FIG. 1 is merely illustrative of an embodiment and does not limit the scope of the systems and methods as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system. An instance of a server system 122 and a client system 113 may be part of the same or a different hardware system. An instance of a server system 122 may be operated by a provider different from an organization operating an embodiment of a system for specifying an object in a design, or may be operated by the same organization operating an embodiment of a system for specifying an object in a design.

Client systems 113, 116, and 119 typically request information from a server system 122 which provides the information. Server systems by definition typically have more computing and storage capacity than client systems. However, a particular computer system may act as both a client and a server depending on whether the computer system is requesting or providing information. Aspects of the system may be embodied using a client-server environment or a cloud-cloud computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 permit users to access and query information or applications stored by server system 122. Some example client systems include portable electronic devices (e.g., mobile communication devices) such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™. In a specific embodiment, a "web browser" application executing on a client system enables users to select, access, retrieve, or query information and/or applications stored by server system 122. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others. Client systems 113, 116, and 119 may run applications to enable users remotely operate switches according to various embodiments.

Figure 2:
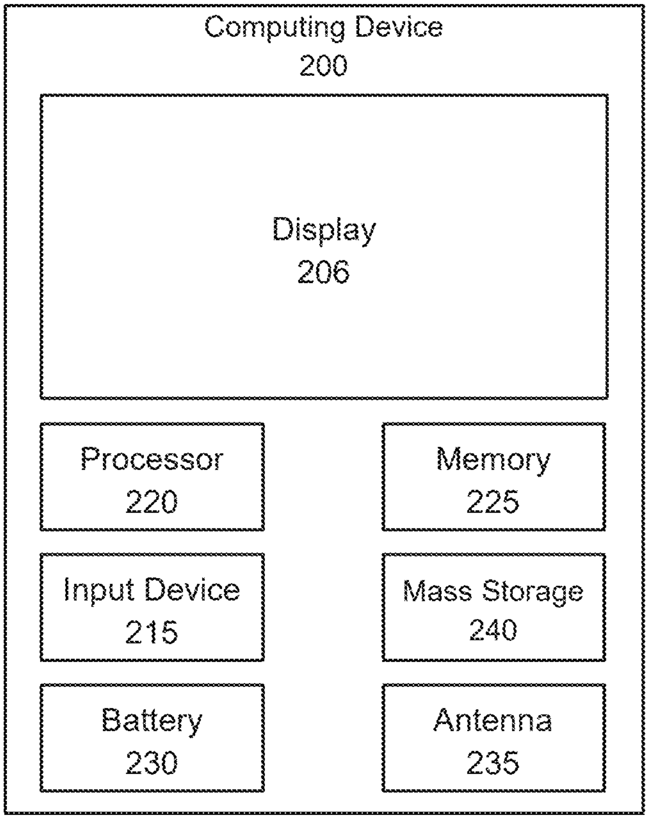
FIG. 2 shows a diagram of an example of a computing device from a system for a tap-to-unlock transmitter device for access points.

FIG. 2 shows a more detailed diagram of an example of a computing device 200 from a system supporting a tap-to-unlock transmitter device for access points. In an embodiment, a user interfaces with the system through a client system 200, such as shown in FIG. 2. Smart device, mobile client communication device, or portable electronic device 200 may include a display, screen, or monitor 206 and an input device 215 stored within a single housing 200. Housing 200 houses familiar computer components, some of which are not shown, such as a processor 220, memory 225, battery 230, speaker, transceiver, network interface/antenna 235, microphone, ports, jacks, connectors, camera, input/output (I/O) controller, display adapter, network interface, mass storage devices 240, and the like. Computer system 200 may include a bus or other communication mechanism for communicating information between components. Mass storage device (or devices) 240 may store a user application and system software components. Memory 225 may store information and instructions to be executed by processor 220.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, gestural interface (contact or non-contact gestures), biometric input sensors, or combinations of these.

Mass storage device 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

System 100 may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use. Other configurations of subsystems suitable for use will be readily apparent to one of ordinary skill in the art. For example, in a specific implementation, the computing device is mobile communication device such as a smartphone or tablet computer. Some specific examples of smartphones include the Droid Incredible and Google Nexus One®, provided by HTC Corporation, the iPhone® or iPad®, both provided by Apple, BlackBerry Z10 provided by BlackBerry (formerly Research In Motion), and many others. The computing device may be a laptop or a netbook. In another specific implementation, the computing device is a non-portable computing device such as a desktop computer or workstation.

A computer-implemented or computer-executable version of the program instructions useful to practice the present subject matter may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the present subject matter may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the subject matter may be transmitted via wires, radio waves, or through a network such as the Internet. In another specific embodiment, a computer program product including a variety of software program code to implement features of the subject matter is provided.

Computer software products may be written in any of various suitable programming languages, such as C, C++, C #, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the subject matter using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 3:
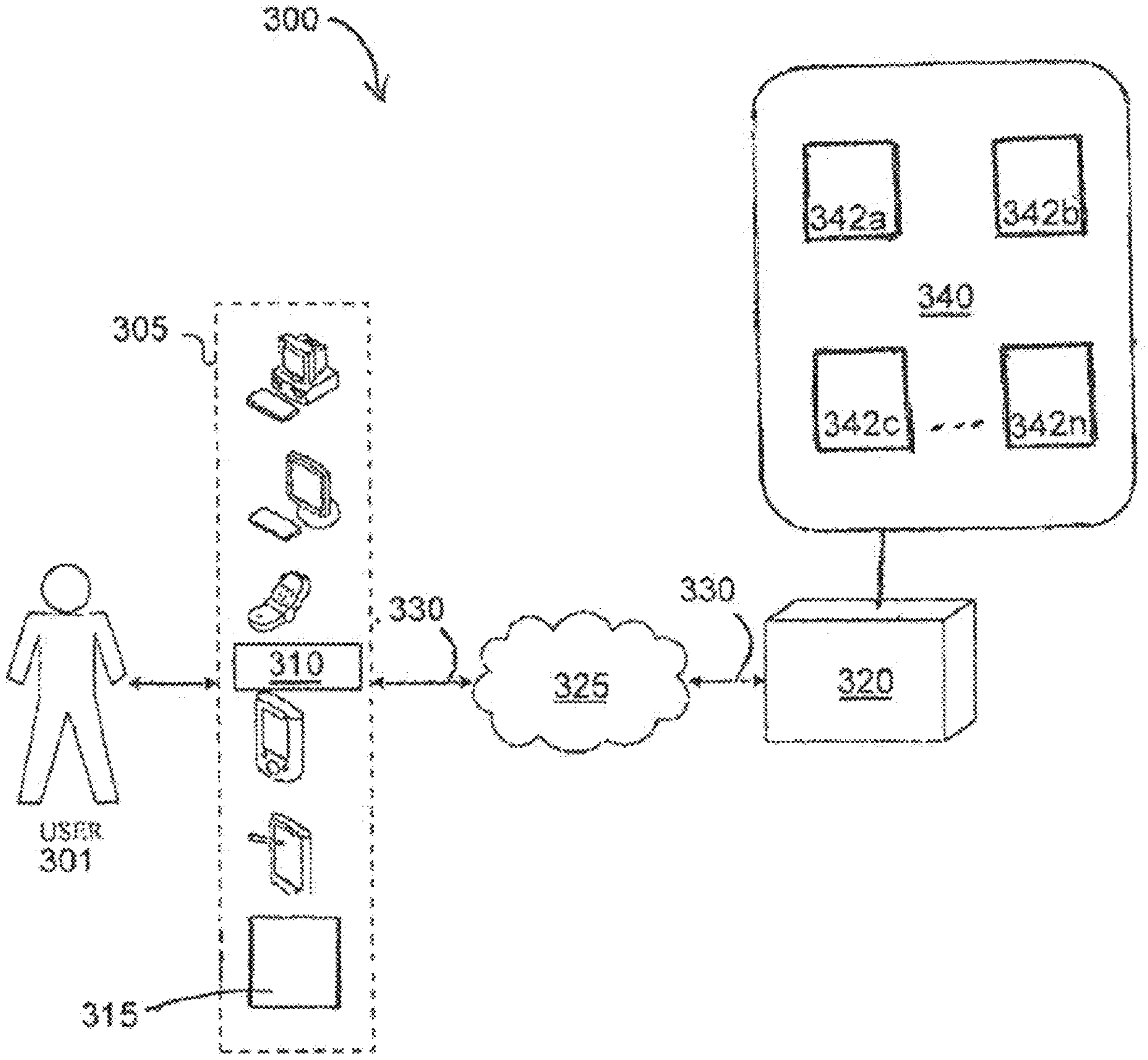
FIG. 3 shows a block diagram of an embodiment of a system utilizing a tap-to-unlock transmitter device for access points.

FIG. 3 is a simplified block diagram of an embodiment of a system 300 supporting a tap-to-unlock transmitter device for access points for use by a user 301. System 300 includes one or more user computing devices 305, and a server 320, coupled to a communication network 325 via a plurality of communication links 330. Computing device 305 may be used to run a user application 310 for remotely operating a switch, e.g., a tap-to-unlock app. User application 310 may use computing device 305 and network 325 to access server 320. Communication network 325 (or "network 325") provides a mechanism for allowing the various components of system 300 to communicate and exchange information with each other via communication links 330. Server 320 may run a switching control component 340, which itself may be comprised of sub-components, e.g., 342*a*, 342*b*, 342*c*, . . . , 342*n*. Sub-components 342*a* . . . 342*n* may include one or more databases. And computing device 305 may itself run an organizational managing component 315, which may perform as switching control component 340, or as one of sub-components 342*a*, 342*b*, 342*c*, . . . , 342*n* in communication with server 320 through network 325. Typically, disclosure directed to "communicating with, accessing, or interacting with" the server should be interpreted as "communicating with, accessing, or interacting with" the switching control component running on the server.

Network 325 may be any suitable communications network. Communication network 325 may itself be comprised of many interconnected computer systems and communication links. As an example and not by way of limitation, one or more portions of network 325 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another suitable network, or a combination of two or more of these. Network 325 may include one or more networks 325.

Connections 330 may connect computing device 305 and server 320 to communication network 325 or to each other. Communication links 330 may be hardwire links, optical links, satellite or other wireless communications links, wave propagation links, or any other mechanisms for communication of information. This disclosure contemplates any suitable connections 325. In particular embodiments, one or more connections 325 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 330 each include an ad hoc network, an intranet, an extranet, a VPN, a LAN, a WLAN, a WAN, a WWAN, a MAN, a portion of the Internet, a portion of the PSTN, a cellular telephone network, another suitable connection 330, or a combination of two or more such connections 330. Connections 330 need not necessarily be the same throughout system 300. One or more first connections 330 may differ in one or more respects from one or more second connections 330.

Server 320 may be a network-addressable computing system that can host one or more switching control components 340. Server 320 may be responsible for receiving information requests from computing device 305 via user application 310, for performing the processing required to satisfy the requests, for generating responses to received inquiries, and for forwarding the results corresponding to the requests back to requesting computing device 305. Server 320 may store, receive, or transmit data and software, and information associated with the data and software (including user data). The processing required to satisfy the requests may be performed by server 320 or may alternatively be delegated to other servers connected to communication network 325. For example, other servers may host switching control component 340, or sub-components 342*a* . . . 342*n*. Server 320 may be an intermediary in communications between a computing device 305 and another server system, or a computing device 305 may communicate directly with another server system. Server 320 may be accessed by the other components of system 300, for example, directly or via network 325. In particular embodiments, one or more users 301 may use one or more computer devices 305 to access, send data to, and receive data from server 320.

Computing device 305, connections 330, and network 325, enable user 301 to access and query information stored and applications run by server 320, such as switching control component 340. Some example computer devices 305 include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS®, Android® OS, Google Chrome® OS, Symbian OS®, Windows Mobile® OS, Windows Phone, BlackBerry® OS, Embedded Linux, Tizen, Sailfish, webOS, Palm OS® or Palm Web OS®.

In an embodiment, user application 310 may be run or executed by a different system. For example, computing device 305, or server 320, or both, may run user application 310. That is, user application 310 may be run by computing device 305, or the application may be run on server 320 and accessed by computing device 305 through a browser and network 325. For example, computing device 305 could be operated as a terminal, with user application 310 being run on a server, e.g., server 320. In an embodiment, aspects or functionalities of user application 310 are run by server 320, or another computing system or server. In an embodiment, the steps of the methods described herein may be performed, at least in part, in cloud-computing environment.

FIG. 3 illustrates a particular arrangement of user 301, computing device 305, and server 320, but this is an example arrangement. Any other suitable arrangement of user 301, computing device 305, server 320, and network 325 may be used. For example, computing device 305 may be connected directly to server 320. Also, computing device 305 and server 320 may appear to be distinct yet operate on the same hardware. In addition, any number of users 301, clients 305, and server 320 may be used in embodiments.

Figure 4:
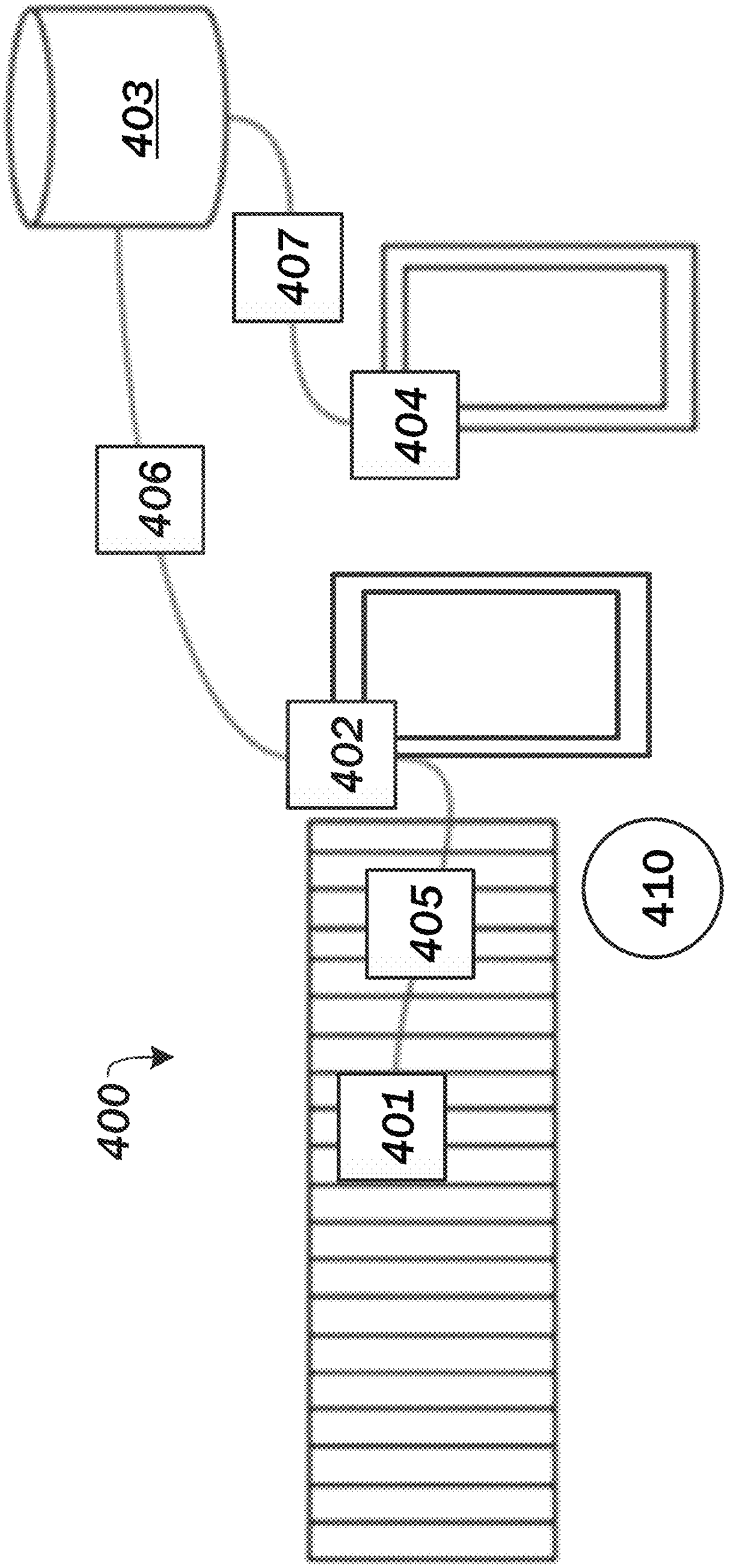
FIG. 4. shows a simplified block diagram of an embodiment of a system utilizing a tap-to-unlock transmitter device for access points.

FIG. 4. illustrates an embodiment of a system 400 for remotely operating a switch. In the embodiment of FIG. 4, a switch-operated device, such as a gate 401, is connected to a switching device 402 by a connection 405. An NFC token 410 is placed in the vicinity of (i.e., proximate to) the gate 401. In the embodiment, the exemplary device, gate 401, is an electrically operated gate that opens or closes depending on the state of switching device 402. In the embodiment, switching device 402 includes a network-enabled device that may close a switching circuit based on commands received over a network 406. For example, switching device 402 may include a network-enabled device that is enabled to connect to network 406, as described with reference to the devices and networks of FIGS. 1-3. Switching device 402 is connected by network 406 to a server 403. Server 403 may run a switching control component such as component 340 (FIG. 3) and may send commands to switching device 402 over network 406. Server 403 may receive information, such as switching requests, switching commands, set-up information, guest user information, user privilege level information, from a user device 404. User device 404 (e.g., computing devices 200, 305, and client devices 105, 110, 115, 305 (FIGS. 1-3)) may communicate with server 403 over a network 407, which may be the same network as network 406, or another network, as described with reference to FIGS. 1-3.

The NFC token may be programmed to transmit a URL along with encryption keys when scanned. The URL provided by the NFC token may include parameters that change on each read (e.g., a read number and encrypted data). When a user accesses the received URL, the server can look at the read number and the encryption data and see if that read has ever been used before, or if a real read has been done that has a higher read number to verify that the user is at the location of the NFC token. As discussed with reference to FIG. 5 and FIG. 6, user device 404 may be used to tap NFC token 410 to obtain access to gate 401.

Additional user devices 404 may also communicate with server 403 over network 407. Additional user devices 404 may all have the same access privileges, or additional user devices 404 may have different access privileges. For example, two user devices 404 may have the same privileges (e.g., one user device 404 may be a "spare" of a second user device 404). Also, for example, one user device 404 may be a primary, or owner, user device with unlimited, primary, or "owner" privileges and a second user device 404 may be a secondary, or "guest," user device with limited or "guest" privileges.

In an embodiment, a user may interface with server 403 using user device 404 running a user interface (not shown). The user interface may reflect whether the user has primary or "owner" privileges or the user has secondary or "guest" privileges. For example, where the user has primary privileges, a list of primary features may be available and the primary user may be able to use (e.g., view, access, customize, etc.) each of the primary features. On the other hand, where the user has secondary privileges, the secondary user may be able to use a subset (or modified subset) of the primary features.

Gate 401 is just an example of the devices that may be controlled by embodiments. Embodiments are envisioned that may control other electronically activated systems, such as an apartment door buzzer, or a manned access point (e.g., a manned gate at the entrance to a gated community). User device 404 may be, e.g., a mobile device, or other network-enabled client device 105, 110, 115 (FIG. 1). Networks 6, 7 may use standard internet protocols that can be wired, Wi-Fi, cellular, other networks referenced in regard to FIGS. 1-3, or combinations of these.

In an embodiment, switching device 402 incorporates a computing device with an operating system. The incorporated computing device may itself be a network-enabled device or may be in addition to a network-enabled device included in switching device 402. The inclusion of the operating system is one feature that enables using a decentralized server between the gate 401 and the user device 404.

In embodiments, control of the switching device has been decentralized by using a server and one or more networks. The server may then be used to communicate commands to the switching device. This enables continuously monitoring the switching device's availability to the server. It also enables updating of server and switching device software, e.g., updating to enhance features or provide additional features, updating to patch security holes, etc. Embodiments allow the server to be exposed to users through online browsers or other network access. With such access, embodiment features and services may be implemented and enhanced to address the user needs. It is anticipated that updates to the switching device would mainly involve security patches and drivers (new or updated) for peripherals, and that updates related to other system features would be made to the server software and application.

In an embodiment, one or more cameras may be connected to the switching device. The ability to update the software on both the server and the switching device allows for updating camera support as new options become available.

One or more embodiments provide the following features, which are enabled or enhanced by networking the switching device with the server: the ability to constantly monitor the device function and connection; the ability to have a centralized logging function; the ability to share an access point with many users; a reduced need for firmware updates, since all connected devices may be monitored, their software determined, and then updated when and as needed; the ability to update the user interface and other software when and as needed; support for peripheral devices, such as lights, cameras, motion sensors, etc.; the ability to remotely use the system over a cellular connection; a reduced need for bandwidth over all connection types; the ability to decouple the user interface from the switching device to support things such as time zones and languages; a reduced code base in the "wild," which makes the system more secure; the ability to schedule switching times; and the ability to integrate with external services (e.g., UPS, Lyft, Uber, Postmates).

Regarding a reduced code base in the "wild" making the system more secure, in an embodiment, though there is considerable code running on the switching control device, the amount of code that is under the control of the system is much reduced—to approximately 1% of the code estimated to be controlled by a known competitor. In the embodiment, the operating system may be an industry standard such as Debian GNU/Linux or Ubuntu. With such operating systems the patching and maintenance is provided by the community. This reduces dramatically the code that is unique to the switching control device itself. The communities involved in maintaining the industry standard operating systems are constantly patching security holes and adding peripheral drivers. Thus, embodiments benefit from this activity and unique system updates can be focused primarily on ensuring the server is secure (which itself may be facilitated by having the server in a secure environment).

Regarding a reduced need for bandwidth, in an embodiment the reduced need results from transmitting simple commands over the network rather than transmitting an entire user interface. This dramatically reduces the overhead of data usage. For example, for a gate with hundreds of users and hundreds of gate opens a day, including a update ping every few seconds to the server to make sure the connectivity is still active, the tap-to-unlock system is estimated to use approximately 50 MB of data a month.

Regarding the ability to integrate with external services, in an embodiment, the external service may be given an access code that allows the service to access a place, such as a house, a gated community, a room, etc. Limitations may be placed on the access privileges in the sense that the access code may be conditionally valid. For example, access privileges may be permanent until surrendered by the service, permanent until revoked by the user, limited in duration, limited to specific time windows, or limited in usage, such as being limited to be used (e.g., allowing access) a predetermined number of times. Access privileges may be limited by combinations of limitations or conditions, as well. For example, in an embodiment an access code may be valid: for a one-time use (e.g., for a delivery); during a particular time of the day (e.g., for a regular delivery); for a duration (e.g., for a visiting guest).

In embodiments, an access may be accepted when the access code is "valid" and not accepted when the access code is "invalid," with the validity or invalidity being determined by limitations or conditions placed on access privileges. In other embodiments, an access code may be valid but accepted or not accepted depending on limitations or conditions placed on access privileges. For example, an access code may be valid to open a particular gate provided no other access code has been used for that particular gate on that particular day. Such a feature would allow first-come, first-served privileges.

In an embodiment, the problems associated with existing systems are addressed and alleviated using a code, such as an NFC token, placed near a door or gate that is to be controlled. Some embodiments may optionally employ any past or future technology that a smart phone may read. For convenience, in this description, all such devices will be referred to as NFC tokens. The NFC token may be used to control a switch, e.g., a lock (electric strike, maglock, cloud controlled deadbolt, etc.) associated with the gate or door. This creates a tap-to-unlock relationship between the NFC token and the access point the associated user has permission to interact with and open.

Figure 5:
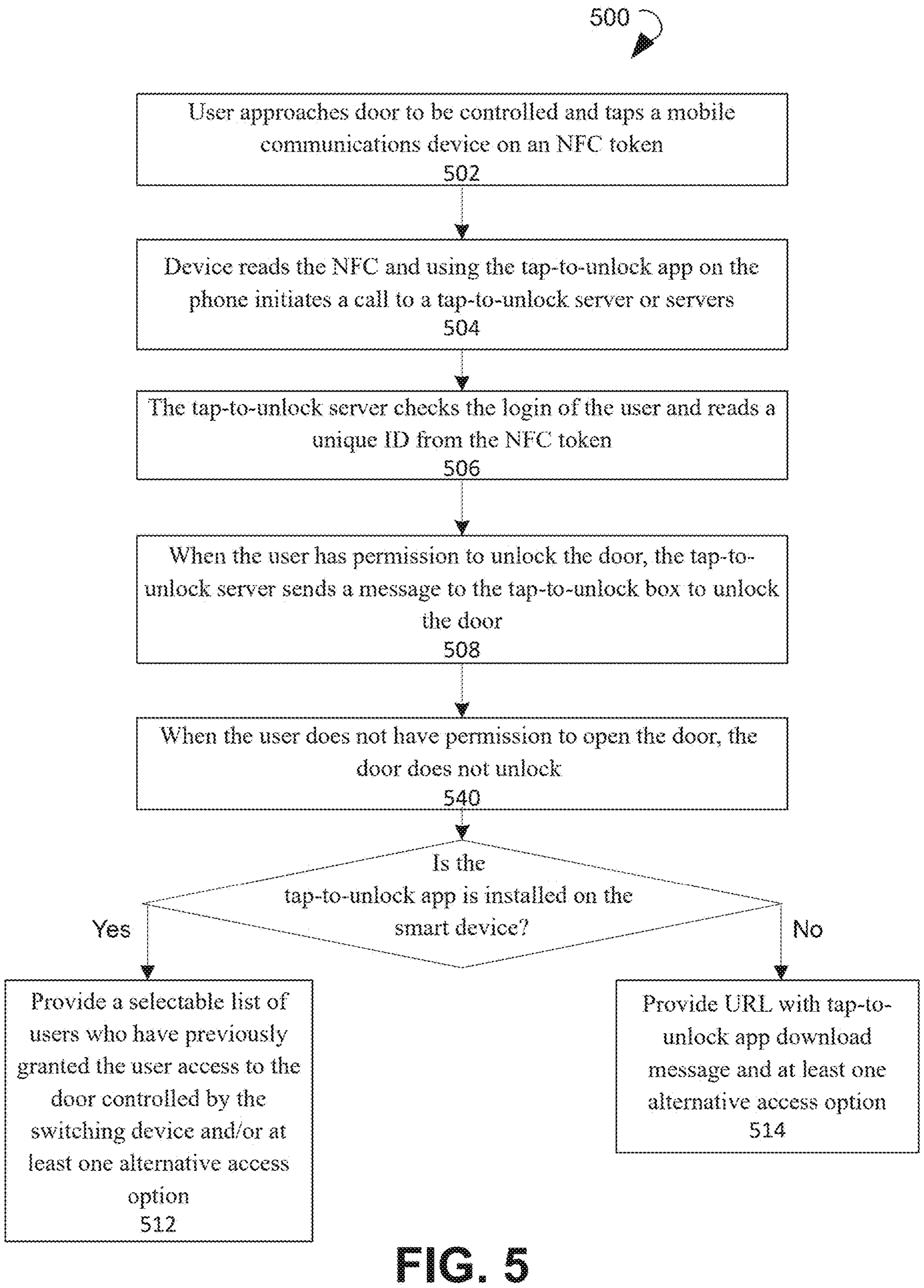
FIG. 5 is a flow chart of an embodiment of a tap-to-unlock method 500 for operation of an access point.

FIG. 5 is a flow chart of an embodiment of a method 500 for the operation of a tap-to-unlock access point system, e.g., as described with reference to FIG. 4. In step 502, the user approaches door to be controlled and taps a mobile communications device, e.g., a smart phone on an NFC token. In step 504, the smart device reads the NFC, and using the tap-to-unlock app on the phone, may initiate a call to a tap-to-unlock server or servers. In step 506, the tap-to-unlock server checks the login of the user and reads a unique ID from the NFC token. For example, the smart phone may read the NFS token. If the user has previously registered with the tap-to-unlock application on the phone, URLs from the read NFS token that match URLs from the registration will be directed by the communications device operating system to the tap-to-unlock app on the phone for subsequent communications with the tap-to-unlock server. If a URL from the read NFS token does not match a URL associated with the phone from the registration, the tap-to-unlock app (or device operating system, when the tap-to-unlock application has not been installed on the device) will open a web browser and direct the user to a URL that will allow the user to install the tap-to-unlock app, or provide more information as described below. In step 508, if the user has permission to unlock the door, the tap-to-unlock server sends a message to the tap-to-unlock box to unlock the door. In step 510, when the user does not have permission to open the door, the primary result is the door does not unlock. In step 512, when the tap-to-unlock app is installed on the smart device, the following non-complete list of actions may be taken: 1) the app presents the user with a list on the phone display of users/tenants that have given the user doorbell access to the door, allowing the user to doorbell the tenant, where "to doorbell" the tenant, means the user is able to request, via the tap-to-unlock app, that the tap-to-unlock server notify that the user is requesting access to the particular door, which the tenant may grant or not; and/or 2) at least one alternative access option may be provided. The at least one alternative access option may be selected from the following non-complete list of actions: 1) the app presents the user with a directory of tenants in the building, and allows doorbell action to any tenant; 2) the app present the user with a directory of tenants and allow the user to initiate a voice of video call to the tenant; and/or 3) the app presents a static message, with contract information for the building, such as a receptionist. In step 514, if the tap-to-unlock app is not installed on the smart device, at least one of the following non-complete list of alternative access options may be taken: 1) the user is presented with a directory of tenants in the building, and allowed doorbell action to any tenant; 2) the user is presented with a directory of tenants and allowed to initiate a voice of video call to any tenant; or 3) the user is presented with a static message, with contract information for the building, such as a receptionist. The options provided in step 514 may be presented by the read of the NFC directing the user to a website associated with the Tap-to-unlock application. At this website, the user may be presented with the options in step 514. Because the read of the secure token verifies the user is actually present at the location associated with the token, the Tap-to-unlock website "knows" the user is actually present at the location and not improperly using an old image or old URL to trick the website into granting access.

Figure 6:
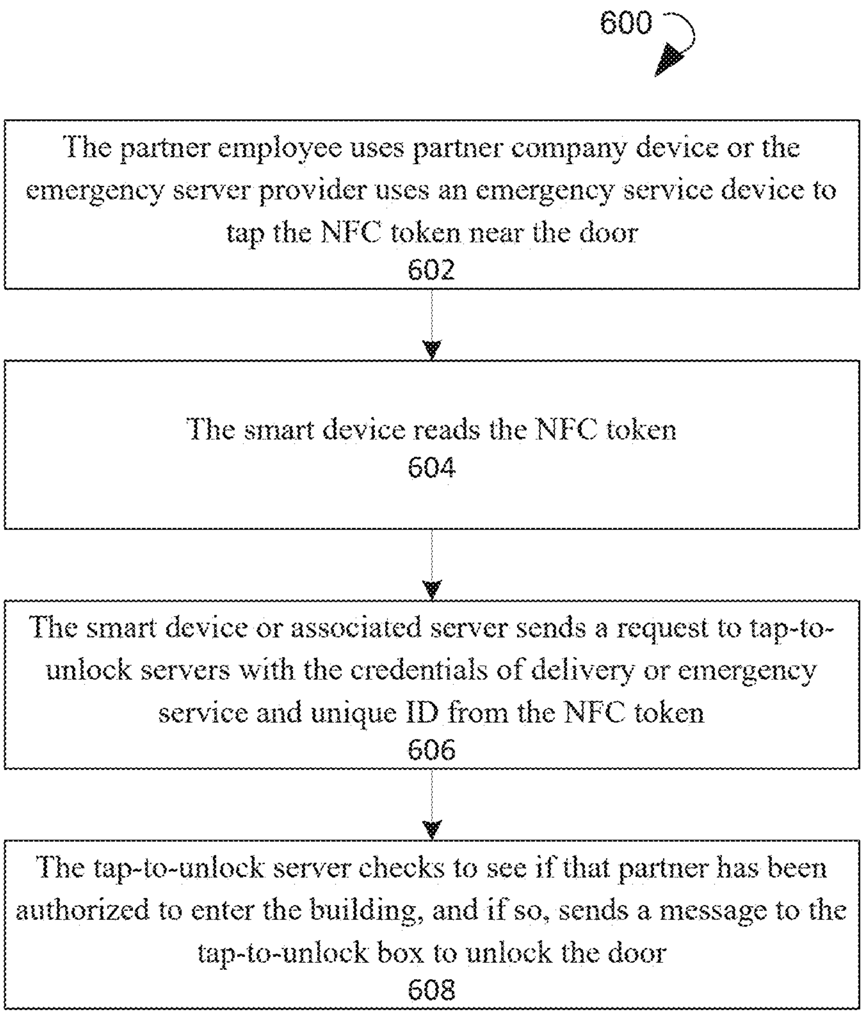
FIG. 6 is a flow chart of an embodiment of a tap-to-unlock method 600 for operation of an access point.

FIG. 6 is a flow chart of an embodiment of a method of a method 600 for the operation of a tap-to-unlock access point system, e.g., as described with reference to FIG. 4, for tap-to-unlock partners, such as delivery services and emergency service providers. In step 602, the partner employee uses partner company device, e.g., a smart device, or the emergency server provider uses an emergency service device, e.g., a smart device, to tap the NFC token near the door. In step 604, the smart device reads the NFC token. In step 606, the smart device or associated server sends a request to tap-to-unlock servers with the credentials of delivery or emergency service and unique ID from the NFC token. For example, if the Tap-to-unlock app is not installed, the read of the token will direct the user to a website associated with the Tap-to-unlock app. And in step 608, the tap-to-unlock server checks to see if that partner has been authorized to enter the building, and if so, sends a message to the tap-to-unlock box to unlock the door.

Thus, embodiments have a number of advantages, which include, in no specific order: the tap-to-unlock box may be installed anywhere inside the building, and the NFC token can be placed next to the door to control; all expensive hardware may be installed on the secure side of the door, versus, e.g., an intercom or directory being installed on the unsecured side; an NFC token need no power; an NFC token may be installed on almost any surface; an NFC token can easily be installed and replaced if damaged; multiple NFC tokens for the same door may be installed (for example one lower of cars, and one higher up for delivery trucks); the same app and system can be used for an infinite number of locations without having to carry tokens for each location.

In embodiments, if the need arises to provide more security for tokens on buildings, the tokens can be used with NFC authentication, where each scan generates a one-time code (OTC) that the tap-to-unlock servers can authenticate, in order to prevent NFC token duplication. For example, part of the NFC specification is that and NFC, when read, provides the read number, which increments up, and an authentication code with that read number. When the NFC is programmed it has a secret that the website associated with the Tap-to-unlock app would also have. As reads happen, the Tap-to-unlock server system tracks the read numbers, so "old" reads can't be repeated. For example, if read number 10 comes in with a proper code, the Tap-to-unlock server marks read 10 as used, and no lower number can be used subsequently. If the next read is read number 15, reads 11-14 would be invalidated-even if the Tap-to-unlock server never received notice of reads 11-14. Then the read number may be combined with the authentication code, the NFC ID, and the secret, so Tap-to-unlock servers can know if the read was an authenticated read.

In an embodiment, an NFC token is placed near a door or gate that is to be controlled. In an embodiment employing NFC tokens that have read counters and are placed in a secure enclosure, token duplication is not possible, and the system can ensure that the device that is reading the token is at a known location.

In an embodiment employing an NFC token, the system may operate according to the following method, described with reference to FIG. 4:

1. A user approaches a door or gate 401 to be controlled.
2. The user taps device 404, e.g., a mobile communications device, on NFC token 410.
3. Device 404 reads NFC 410 obtaining a unique ID number, and initiates a communication with server 403, e.g., using an application on device 404 dedicated to system 400 that initiates an API call to an application hosted by server 403. The API call may include transmitting login data associated with a user and the URL received from the NFC token as discussed below.
4. The application hosted by server 403 (in communication with the application installed on device 404) verifies the user, e.g., the application checks the login of the user, and looks up: the unique ID from the NFC token, a read counter associated with the NFC token, and a secure message associated with NFC token 410 (e.g. the authentication token, which may or not be encrypted in some embodiments).
5. Server 403 checks to make sure the ID of the NFC token is valid: if so, it proceeds; if not, it fails to open the door at this step. Checking that the ID of the NFC token is valid may include use of the NFC ID, read number, and the authentication token. Each read number and authentication token is a unique couplet for that NFC ID. As read numbers get "used" as they increment, the Tap-to-unlock server system invalidates any read number that would be presented that would be lower than the most recent read number. For example, a first user may perform a read of the NFC token and receive a URL with a read number 101. If the first user does not access the received URL, and a second user subsequently performs a read of the NFC token and receives a URL with a read number 102, the server would know upon receipt of the second user's URL request to disregard any request by the first user subsequent attempted access using read number 101.
6. When server 403 determines, from accessing a database, that the user has permission to unlock door 401, server 403 sends a message to switching device 402, e.g., a control box, to unlock door 401.
7. When the user does not have permission to open door 401, the primary result is that door 401 does not unlock, however the following non-complete list of additional things may happen:
   a. Device 402, may, through the dedicated application:
      i. Present user with list of tenants that have given the user doorbell access to the door they are at, allowing the user to doorbell the tenant.
      ii. Present the user with a directory of tenants in a building associated with door 401 and allow doorbell action to any tenant.
      iii. Present the user with a directory of tenants and allow the user to initiate a voice or video call to the tenant.
      iv. Present a static message, with contact information for the building, such as a receptionist.
   b. If the dedicated application is not installed on device 404, a url, obtained by server 403 when accessing the database and looking up the ID of NFC token 410, is given to phone 404 will include the secure message (e.g., a "SUN," the secure part of the message)), hence the server application can ensure it's a proper read of that token, and that the person is in proximity to the door 401:
      i. Present the user with a directory of tenants in the building and allow doorbell action to any tenant.

ii. Present the user with a directory of tenants and allow the user to initiate a voice or video call to the tenant.

iii. Present a static message, with contact information for the building, such as a receptionist.

For example, in step 7b above, a read of the token may cause the device to receive a URL of "https://website.com/secure-token/XXXX-YYYY&read_num=##&auth=ZZZZ." Where the XXXX-YYYY is the token ID, the ## is the read number, and the ZZZZ is the authentication token for that read number. The Tap-to-unlock app upon installation may register the URL preamble of "https://website.com/secure-token/ . . . " with the phone's OS. The OS may then send all of the data to the Tap-to-unlock (if the Tap-to-unlock app was already installed). If the app wasn't installed, it would open the URL above in a browser. Since Tap-to-unlock servers are the target of the URL requested by the browser, the Tap-to-unlock servers may confirm the token read is authenticated, and present information to the user, from a directory, to allow the user to install the app and/or to allow "doorbelling" by the user using the browser.

In an embodiment employing an NFC token, for tap-to-unlock partners, such as delivery services and emergency service providers, the system may operate according to the following method, described with reference to FIG. 4:

1. Partner employee uses partner company communications device 404 to tap token 410 near door 401
2. Phone or partner device 404 reads the unique ID of NFC token 410.
3. Phone or partner device 410, or a partner company server (after communication from phone or partner device 410), sends request to application on server 403 with credentials of delivery service and unique ID of NFC token 410.
4. Application on server 403 checks credentials and looks up NFC 410 ID on database to see if that partner has been authorized to unlock door 401, and if so, send a message to switching device 402 to unlock the door.

Systems disclosed within this application may have one or more of the following advantageous features. In no specific order:

1. Switching device 402 box can be installed anywhere inside a building associated with door/gate 401, and NFC token 410 may be placed next to door 401 to control access.
2. All expensive hardware may be installed on a secure side of door 401, in comparison to an intercom or directory being installed on the unsecured side.
3. NFC token 410 needs no power.
4. NFC token 410 may be installed on almost any surface.
5. NFC token 410 may be easily installed and replaced if damaged.
6. Multiple NFC token 410 may be associated with the same door 410 (for example one lower for cars, and one higher up for delivery trucks).
7. The same app and system can be used for an infinite number of locations without having to carry tokens for each one.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

Various aspects of the present invention may be appreciated from the following enumerated example embodiments (EEEs):

EEE 1. A method for operation of a switching device, the method comprising:

receiving, via a communications link with a mobile communications device, by a switching control component on a server, a uniform resource locator (URL) request that includes a unique ID from a near field communication (NFC) token, the NFC token being located proximate to the switching device, the URL request including a URL received from the NFC token that includes the unique ID, a read number, and an authentication token;

determining if the URL request is valid by confirming that the read number and the authentication token included within the URL request are associated with the NFC token; and when the URL request is valid, determining, by the switching control component, if the URL request includes valid login data associated with a user, the switching control component:

automatically responding to the URL request by transmitting a message, via a different communications link to the switching device, that includes instructions to open a door controlled by the switching device when both the URL request includes valid login data and the user is associated with an account that has permission to unlock the door by the switching control component; and automatically responding to the URL request, via the communications link, with a URL providing both at least one of a tap-to-unlock application download message and at least one alternative access option when the URL request does not include valid login data associated with the user.

EEE 2. The method of claim 1, the determining if the URL request is valid comprising comparing the read number to previously received read numbers to confirm that the read number of the URL request is a greater value than any previously-received read number.

EEE 3. The method of claim 2, where the read number and the authentication token form a unique pair associated with the NFC token, the read number being incremented with each use of the NFC token.

EEE 4. The method of claim 1, the at least one alternative access option being selected from a list comprising:

presenting the user with a directory of tenants in the building that includes the door, and allowing a doorbell action to any tenant on the directory;

presenting the user with the directory of tenants and allow the user to initiate a voice or video call to any tenant in the directory; or presenting a static message with contact information for a contact user for the building.

EEE 5. The method of claim 1, the user interface further including at least one alternative access option.

EEE 6. The method of claim 1, the URL request being a URL automatically generated by the tap-to-unlock application in response to scanning the NFC token that includes the unique ID, a read number, and an authentication token, the read number and the authentication token being generated by the tap-to-unlock application being in communication with the NFC token.

EEE 7. The method of claim 1, the door being associated with a plurality of NFC tokens, each of the plurality of NFC tokens being assigned to a different type of user.

EEE 8. A system for controlling a switch, the system comprising:

a mobile communications device;

a network-enabled switching device for controlling the switch; and a server containing instructions which when executed cause the server to:

receive, via a communications link with the mobile communications device, by a switching control component on the server, a uniform resource locator (URL) request that includes a unique ID from a near field communication (NFC) token, the NFC token being located proximate to the switching device, the URL request including a URL received from the NFC token that includes the unique ID, a read number, and an authentication token; and determine if the URL request is valid by confirming that the read number and the authentication token included within the URL request are associated with the NFC token; and when the URL request is valid, determine, by the switching control component, if the URL request includes valid login data associated with a user, the switching control component:

automatically responding to the URL request with a message, via a different communications link to the switching device, that includes instructions to open a door controlled by the switching device when both the URL request includes valid login data and the user is associated with an account that has permission to unlock the door by the switching control component;

automatically responding to the URL request, via the communications link, with a URL providing both at least one of a tap-to-unlock application download message and at least one alternative access option when the URL request does not include valid login data associated with the user.

EEE 9. The system of claim 8, the determining if the URL request is valid comprising comparing the read number to previously received read numbers to confirm that the read number of the URL request is a greater value than any previously-received read number.

EEE 10. The system of claim 9, where the read number and the authentication token form a unique pair associated with the NFC token, the read number being incremented with each use of the NFC token.

EEE 11. The system of claim 8, the at least one alternative access option being selected from a list comprising:

presenting the user with a directory of tenants in the building that includes the door, and allowing a doorbell action to any tenant on the directory;

presenting the user with the directory of tenants and allow the user to initiate a voice or video call to any tenant in the directory; or presenting a static message with contact information for a contact user for the building.

EEE 12. The system of claim 8, the user interface further including at least one alternative access option.

EEE 13. The system of claim 8, the URL request being a URL automatically generated by the tap-to-unlock application in response to scanning the NFC token that includes the unique ID, a read number, and an authentication token, the read number and the authentication token being generated by the tap-to-unlock application being in communication with the NFC token.

EEE 14. The system of claim 8, the door being associated with a plurality of NFC tokens, each of the plurality of NFC tokens being assigned to a different type of user.

EEE 15. A method for operation of a switching device, the method comprising:

receiving, via a communications link with one of a partner mobile communications device or a partner server, by a switching control component on a server, a uniform resource locator (URL) request that includes a unique ID from a near field communication (NFC) token, the NFC token being located proximate to the switching device; and determining, by the switching control component, if the URL request includes valid delivery service data associated with a partner service, the switching control component:

automatically responding to the URL request by transmitting a message, via a different communications link to the switching device, that includes instructions to open a door controlled by the switching device when both the URL request includes valid delivery service data and the user is associated with an account that has permission to unlock the door by the switching control component; and automatically responding to the URL request by transmitting a message, via the communications link and a tap-to-unlock application running on the mobile communications device, with a user interface that includes a message explaining that the URL request is denied when both the URL request includes valid delivery service data and the user is not associated with an account that has permission to unlock the door by the switching control component.

EEE 16. The method of claim 15, the door being associated with a plurality of NFC tokens, each of the plurality of NFC tokens being assigned to a different type of user, the NFC token being assigned to delivery service users being different from an NFC token of the plurality assigned to individual users.

EEE 17. The method of claim 15, the URL request being a URL received from the NFC token in response to scanning the NFC token that includes the unique ID, a read number, and an authentication token.

EEE 18. The method of claim 17, further comprising determining if the URL request is valid by comparing the read number to previously received read numbers to confirm that the read number of the URL request is a greater value than any previously-received read number.

EEE 19. The method of claim 18, where the read number and the authentication token form a unique pair associated with the NFC token, the read number being incremented with each use of the NFC token.

EEE 20. A method for operation of a switching device, the method comprising:

receiving, via a communications link with a mobile communications device, by a switching control component on a server, a uniform resource locator (URL) request that includes a unique ID from a near field communication (NFC) token, the NFC token being located proximate to the switching device, the URL request including a URL received from the NFC token that includes the unique ID, a read number, and an authentication token;

determining if the URL request is valid by confirming that the read number and the authentication token included within the URL request are associated with the NFC token; and when the URL request is valid, determining, by the switching control component, if the URL request includes valid login data associated with a user, the switching control component:

automatically responding to the URL request by a message, via the communications link and a tap-to-unlock application running on the mobile communications device, with a user interface providing a selectable list of users who have previously granted the user access to the door controlled by the switching device when both the URL request includes valid login data and the user is not associated with an account that has permission to unlock the door by the switching control component, where the switching control component causes a selected user on the list of users to be contacted via the tap-to-unlock application in response to being selected on the user interface; and automatically responding to the URL request, via the communications link, with a URL providing both at least one of a tap-to-unlock application download message and at least one alternative access option when the URL request does not include valid login data associated with the user.

The invention claimed is:

1. A method for operation of a switching device, the method comprising:

receiving, via a communications link with a mobile communications device, by a switching control component on a server, a uniform resource locator (URL) request that includes a unique identifier (ID) from a near field communication (NFC) token, the NFC token being located proximate to the switching device, the URL request including a URL received from the NFC token that includes the unique ID, a read number, and an authentication token;

determining if the URL request is valid by confirming that the read number and the authentication token included within the URL request are associated with the NFC token; and when the URL request is valid, determining, by the switching control component, if the URL request includes valid login data associated with a user, the switching control component:

automatically responding to the URL request by transmitting a message, via a different communications link to the switching device, that includes instructions to open a door controlled by the switching device when both the URL request includes valid login data and the user is associated with an account that has permission to unlock the door by the switching control component; and automatically responding to the URL request, via the communications link, with a URL providing both at least one of a tap-to-unlock application download message and at least one alternative access option when the URL request does not include valid login data associated with the user.

2. The method of claim 1, the determining if the URL request is valid comprising comparing the read number to previously received read numbers to confirm that the read number of the URL request is a greater value than any previously-received read number.

3. The method of claim 2, where the read number and the authentication token form a unique pair associated with the NFC token, the read number being incremented with each use of the NFC token.

4. The method of claim 1, the at least one alternative access option being selected from a list comprising:

presenting the user with a directory of tenants in the building that includes the door, and allowing a doorbell action to any tenant on the directory;

presenting the user with the directory of tenants and allow the user to initiate a voice or video call to any tenant in the directory; or presenting a static message with contact information for a contact user for the building.

5. The method of claim 1, the user interface further including at least one alternative access option.

6. The method of claim 1, the URL request being a URL automatically generated by the tap-to-unlock application in response to scanning the NFC token that includes the unique ID, a read number, and an authentication token, the read number and the authentication token being generated by the tap-to-unlock application being in communication with the NFC token.

7. The method of claim 1, the door being associated with a plurality of NFC tokens, each of the plurality of NFC tokens being assigned to a different type of user.

8. A system for controlling a switch, the system comprising:

a mobile communications device;

a network-enabled switching device for controlling the switch; and a server containing instructions which when executed cause the server to:

receive, via a communications link with the mobile communications device, by a switching control component on the server, a uniform resource locator (URL) request that includes a unique ID from a near field communication (NFC) token, the NFC token being located proximate to the switching device, the URL request including a URL received from the NFC token that includes the unique ID, a read number, and an authentication token; and determine if the URL request is valid by confirming that the read number and the authentication token included within the URL request are associated with the NFC token; and when the URL request is valid, determine, by the switching control component, if the URL request includes valid login data associated with a user, the switching control component:

automatically responding to the URL request with a message, via a different communications link to the switching device, that includes instructions to open a door controlled by the switching device when both the URL request includes valid login data and the user is associated with an account that has permission to unlock the door by the switching control component;

automatically responding to the URL request, via the communications link, with a URL providing both at least one of a tap-to-unlock application download message and at least one alternative access option when the URL request does not include valid login data associated with the user.

9. The system of claim 8, the determining if the URL request is valid comprising comparing the read number to previously received read numbers to confirm that the read number of the URL request is a greater value than any previously-received read number.

10. The system of claim 9, where the read number and the authentication token form a unique pair associated with the NFC token, the read number being incremented with each use of the NFC token.

11. The system of claim 8, the at least one alternative access option being selected from a list comprising:

presenting the user with a directory of tenants in the building that includes the door, and allowing a doorbell action to any tenant on the directory;

presenting the user with the directory of tenants and allow the user to initiate a voice or video call to any tenant in the directory; or presenting a static message with contact information for a contact user for the building.

12. The system of claim 8, the user interface further including at least one alternative access option.

13. The system of claim 8, the URL request being a URL automatically generated by the tap-to-unlock application in response to scanning the NFC token that includes the unique ID, a read number, and an authentication token, the read number and the authentication token being generated by the tap-to-unlock application being in communication with the NFC token.

14. The system of claim 8, the door being associated with a plurality of NFC tokens, each of the plurality of NFC tokens being assigned to a different type of user.

15. A method for operation of a switching device, the method comprising:

receiving, via a communications link with one of a partner mobile communications device or a partner server, by a switching control component on a server, a uniform resource locator (URL) request that includes a unique ID from a near field communication (NFC) token, the NFC token being located proximate to the switching device; and determining, by the switching control component, if the URL request includes valid delivery service data associated with a partner service, the switching control component:

automatically responding to the URL request by transmitting a message, via a different communications link to the switching device, that includes instructions to open a door controlled by the switching device when both the URL request includes valid delivery service data and the user is associated with an account that has permission to unlock the door by the switching control component; and automatically responding to the URL request by transmitting a message, via the communications link and a tap-to-unlock application running on the mobile communications device, with a user interface that includes a message explaining that the URL request is denied when both the URL request includes valid delivery service data and the user is not associated with an account that has permission to unlock the door by the switching control component.

16. The method of claim 15, the door being associated with a plurality of NFC tokens, each of the plurality of NFC tokens being assigned to a different type of user, the NFC token being assigned to delivery service users being different from an NFC token of the plurality assigned to individual users.

17. The method of claim 15, the URL request being a URL received from the NFC token in response to scanning the NFC token that includes the unique ID, a read number, and an authentication token.

18. The method of claim 17, further comprising determining if the URL request is valid by comparing the read number to previously received read numbers to confirm that the read number of the URL request is a greater value than any previously-received read number.

19. The method of claim 18, where the read number and the authentication token form a unique pair associated with the NFC token, the read number being incremented with each use of the NFC token.

20. A method for operation of a switching device, the method comprising:

receiving, via a communications link with a mobile communications device, by a switching control component on a server, a uniform resource locator (URL) request that includes a unique ID from a near field communication (NFC) token, the NFC token being located proximate to the switching device, the URL request including a URL received from the NFC token that includes the unique ID, a read number, and an authentication token;

determining if the URL request is valid by confirming that the read number and the authentication token included within the URL request are associated with the NFC token; and when the URL request is valid, determining, by the switching control component, if the URL request includes valid login data associated with a user, the switching control component:

automatically responding to the URL request by a message, via the communications link and a tap-to-unlock application running on the mobile communications device, with a user interface providing a selectable list of users who have previously granted the user access to the door controlled by the switching device when both the URL request includes valid login data and the user is not associated with an account that has permission to unlock the door by the switching control component, where the switching control component causes a selected user on the list of users to be contacted via the tap-to-unlock application in response to being selected on the user interface; and automatically responding to the URL request, via the communications link, with a URL providing both at least one of a tap-to-unlock application download message and at least one alternative access option when the URL request does not include valid login data associated with the user.

* * * * *